(12) United States Patent
Onagawa (10) Patent No.: US 6,567,882 B1
(45) Date of Patent: May 20, 2003

(54) PCI FUNCTION EXTENSION CONTROL DEVICE AND METHOD OF PCI FUNCTION EXTENSION CONTROL

(75) Inventor: Seiki Onagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/438,635

(22) Filed: Nov. 12, 1999

(30) Foreign Application Priority Data

Nov. 12, 1998 (JP) .......................................... 10-321186

(51) Int. Cl.⁷ .............................................. G06F 13/00
(52) U.S. Cl. ....................................... 710/314; 710/313
(58) Field of Search ................................. 710/314, 311, 710/306, 310, 313, 104

(56) References Cited

U.S. PATENT DOCUMENTS 6,081,863 A * 6/2000 Kelley et al. ............... 710/312
6,189,063 B1 * 2/2001 Rekeita et al. .............. 710/314
6,233,641 B1 * 5/2001 Graham et al. ............. 710/314
6,247,086 B1 * 6/2001 Allingham .................. 710/314
6,272,576 B1 * 8/2001 Porterfield .................. 710/104
6,272,582 B1 * 8/2001 Streitenberger et al. .... 710/314

* cited by examiner

Primary Examiner—Glenn A. Auve
(74) Attorney, Agent, or Firm—Scully, Scott, Murphy & Presser (57) ABSTRACT

A PCI function extension control circuit 1 monitors the transaction of a first PCI bus and a second PCI bus and makes a bus switch emit an open and close control signal when it concerns an access to a desired configuration area. The bus switch disconnects or connect the PCI bus 101 and the PCI bus 102 upon the reception of the open and close control signal from the PCI function extension control circuit 1. The PCI function extension control circuit 1 outputs a desired PCI control signal to the first PCI bus, or the second PCI bus.

7 Claims, 8 Drawing Sheets

IDLE
    goto IDLE      if (FRAME_A # =1)
    goto B_BUSY  if (FRAME_A # =0) * (Hit=0)
    goto S_DATA  if (FRAME_A # =0) * (Hit=1)
TURN_AR
    goto IDLE      if (FRAME_A # =1)
    goto B_BUSY  if (FRAME_A # =0) * (Hit=0)
    goto S_DATA  if (FRAME_A # =0) * (Hit=1)
B_BUSY
    goto B_BUSY  if ((FRAME_A # =0) * (D_done=0)) * (Hit=0)
    goto IDLE      if ((FRAME_A # =1) * (D_done=1))
                      + ((FRAME_A # =1) * (D_done=0)) * (DEVSEL_A # =0)
S_DATA
    goto S_DATA  if ((FRAME_A # =0) + (IRDY_A # =1))
                      * (TRDY_A # =0) * (STOP_A # =0)
                      + ((FRAME_A # =0) * (STOP_A # =1))
                      + ((FRAME_A # =1) * (TRDY_A # =1) * (STOP_A # =1))
    goto BACKOFF if ((FRAME_A # =0) * (STOP_A # =0)
                      * ((IRDY_A # =0)+(TREY_A # =1))
    goto TURN_AR if (FRAME_A # =1) * (IRDY_A # =0)
                      * ((TRDY_A # =0) + (STOP_A # =0))
BACKOFF
   goto BACK_OFF if (FRAME_A # =0)
   goto TURN_AR  if (FRAME_A # =1)

PCI FUNCTION EXTENSION CONTROL DEVICE AND METHOD OF PCI FUNCTION EXTENSION CONTROL

BACKGROUND OF THE INVENTION

The present invention relates to, in a PCI bus system, a technique for extending the PCI functions based on the information of an extended PCI configuration area, by a virtual addition of a PCI configuration area which a PCI agent device did not possess in advance.

PCI (Peripheral Component Interconnect) is a bus standard proposed mainly by the US Intel Corp.

In the PCI bus standard, devices participating to the PCI bus data transfer are called "PCI agent device".

On the other hand, PCI functions are realized by storing in advance the PCI function information, in a PCI configuration area possessed by a PCI agent device, as described in "PCI Bus Power Management Interface Specification Version 1.0" PCI Special Interest Group.

Now, in the conventional PCI bus system, when extending the configuration area of an existing PCI agent device, and extending the function using the configuration area, the design of that PCI agent device has been modified, or a configuration area to be extended, or a new device comprising a function using the configuration area to be extended has been arranged in a previous stage of the PCI agent device.

One of such methods is PCI-to-PCI bridge proposed by "PCI to PCI Bridge Architecture Specification" (PCI Special Interest Group).

As will later be described more in detail, this proposition describes a guideline concerning the control method of the bridge circuit for relaying a first PCI bus (primary bus) and a second PCI bus (secondary bus) in the composition of a plurality of PCI buses.

However, this proposition has the following problems.

First, the circuit scale of PCI-to-PCI bridge circuit is too large. Moreover, this large circuit scale increases the designing load and the price of the device to be manufactured.

Second, the control of functions to be extended is delicate.

SUMMARY OF THE INVENTION

It is therefore an object of the present invention to resolve these problems and to provide a technique for extending the PCI functions based on the information of an extended PCI configuration area, by a virtual addition of a PCI configuration area which a PCI agent device did not possess in advance, by operating the bus transaction from the PCI host bridge to the PCI agent device.

Other objects of the present invention will become clear as the description proceeds.

To achieve the object mentioned above, the PCI function extension control device in a PCI bus system according to the present invention comprises: a PCI function extension control circuit to be connected to a first PCI bus; a new second PCI bus possessed by the PCI function extension control circuit; a bus switch to be connected between the first PCI bus and a second PCI bus; and means for disconnecting or connecting the first PCI bus and the second PCI bus upon the reception of an open and close control signal from the PCI function extension control circuit, the bus switch being connected to the PCI function extension control circuit; and is characterized by that the PCI function extension control circuit includes means to monitor the transaction of the first PCI bus and the second PCI bus, to make the bus switch emit an open and close control signal when it concerns an access to a desired configuration area, and to deliver a desired PCI control signal to the first PCI bus, or the second PCI bus.

The PCI function extension control circuit is characterized by that it comprises means to monitor the transaction of the first PCI bus and the second PCI bus, to make the bus switch emit an open and close control signal when it concerns an access to a desired configuration area in a PCI agent device to be connected to the second PCI bus, and to deliver a desired PCI control signal to the first PCI bus, or the second PCI bus.

The PCI function extension control circuit is characterized by that it comprises means to monitor the transaction of the first PCI bus and the second PCI bus, to make the bus switch emit an open and close control signal when it concerns an access to a desired configuration area in a PCI agent device to be connected to the second PCI bus, and to deliver a desired PCI control signal to the first PCI bus, or the second PCI bus; and means to make an extension circuit to be connected to the PCI agent device deliver a control signal.

Here, an extension circuit means a device to be connected to the PCI agent device. For instance, if the PCI agent device is a SCSI (Small Computer System Interface) board, it concerns a hard disk and a scanner to be connected to them.

The PCI function extension control device is characterized by that it further comprises a bus buffer to be connected to the first PCI bus; the PCI function extension control circuit is connected to the first PCI bus via the bus buffer; and the bus switch is connected to the first PCI bus via the bus buffer.

These means allow to extend the PCI function based on the information of the extended PCI configuration area.

The present inventions for achieving the object mentioned above concerns also a method of PCI function extension control for a PCI bus system comprising a first PCI bus, a PCI function extension control circuit to be connected to the first PCI bus, a second PCI bus possessed by the PCI function extension control circuit, a bus switch to be connected between the first PCI bus and the second PCI bus (including a means for disconnecting or connecting the first PCI bus and the second PCI bus), and a PCI device agent to be connected to the second PCI bus, comprising the steps of: monitoring if the transaction of the first PCI bus and the second PCI bus is an access to a desired configuration area or not; and when the result of said monitoring step concerns the access to the desired configuration area, controlling the bus switch, and to deliver a desired PCI control signal to the first PCI bus, and the second PCI bus.

It is also characterized by that it comprises the steps of: monitoring if the transaction of the first PCI bus and the second PCI bus is an access to a desired configuration area in the PCI agent device or not; and when the result of the monitoring step concerns the access to the desired extension configuration area, controlling the bus switch, and delivering an extending desired PCI control signal to the first PCI bus, and the second PCI bus.

Moreover, it is characterized by that it comprises the steps of: monitoring if the transaction of the first PCI bus and the second PCI bus is an access to a desired configuration area in the PCI agent device or not; when the result of the monitoring step concerns the access to the desired extension configuration area, controlling the bus switch, and to deliver an extending desired PCI control signal to the first PCI bus, and the second PCI bus; and when the result of the monitoring step concerns the access to the desired extension configuration area, delivering a control signal to an extension circuit to be connected to the PCI agent device.

Additionally, a method of PCI function extension control for a PCI bus system, comprising the steps of: making a PCI function extension control circuit monitor if the transaction of the first PCI bus is an access to a desired configuration area or not; when the result of the monitoring step concerns the access to the desired configuration area, disconnecting a signal from the first PCI bus to the PCI agent device to deliver a desired PCI control signal to the PCI agent device via the second PCI bus; making the PCI function extension control circuit monitor if the transaction of the second PCI bus is an access to a desired configuration area or not; and when the result of the monitoring step concerns the access to the desired configuration area, disconnecting a signal from the PCI agent device to the first PCI bus to deliver a desired PCI control signal to the PCI agent device.

These steps allow to extend the PCI function based on the information of the extended PCI configuration area.

DETAILED DESCRIPTION OF THE PREFERRED EMBODIMENTS

Figure 1:
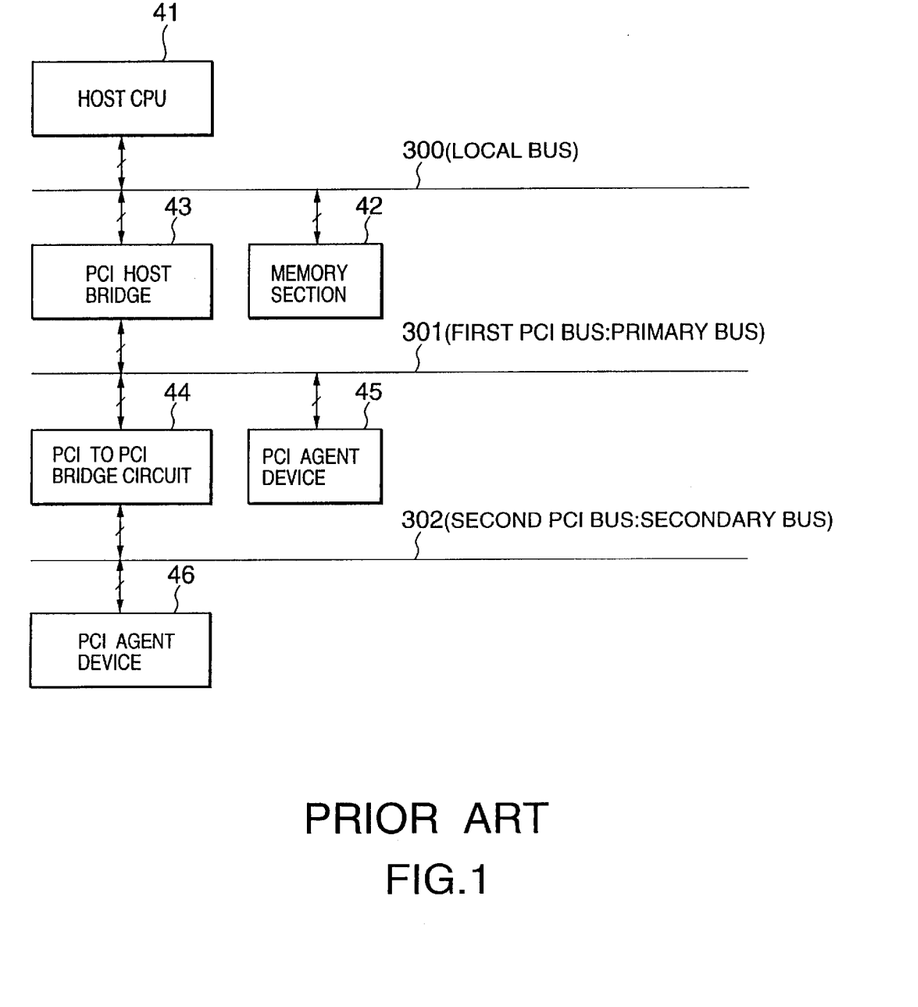
FIG. 1 is an outline diagram showing a system using a conventional PCI-to-PCI bridge circuit.

Referring to FIG. 1, description is, at first made about a system using a conventional PCI-to-PCI bridge circuit mentioned before in order to facilitate an understanding of the present invention.

FIG. 1 shows an outline of the system using the conventional PCI-to-PCI bridge circuit.

In FIG. 1, 41 is a host CPU. The CPU 41 is connected to a local bus (called "processor bus" hereafter) to control external peripheral devices through this processor bus 300.

42 is a memory section. The memory section 42 is connected to the processor bus 300. The memory section 42 performs data writing and call.

43 is a PCI host bridge. The PCI host bridge 43 is connected to the processor bus 300 to which the host CPU 41 is to be connected, and to a first PCI bus 301. The PCI host bridge 43 interfaces and connects (in terms of data) the processor bus 300 and the first PCI bus 301. Moreover, the PCI host bridge 43 performs the access control of the memory section 42, or the like.

44 is a PCI-to-PCI bridge circuit. The PCI-to-PCI bridge circuit 44 is connected to the first PCI bus 301 and a second PCI bus 302. Moreover, the PCI-to-PCI bridge circuit 44 includes a means for interfacing the first PCI bus (primary bus) 301 and a means for interfacing the second PCI bus (secondary bus) 302. Further, the PCI-to-PCI bridge circuit 44 is composed of a configuration register to set a PCI space (configuration area) 25 or the like according to the PCI bus standard, a data buffer used for bus cycle delivery of both PCI buses, and the like. Then, the PCI-to-PCI bridge circuit 44 interfaces and connects (in terms of data) the first PCI bus 301 and the second PCI bus 302. This PCI-to-PCI bridge circuit 44 is normally composed of one or a plurality of LSI.

45 and 46 are PCI agent devices. The PCI agent device 45 is to be connected to the first PCI bus 1. While the PCI agent device 46 is to be connected to the second PCI bus 302.

Thus, a plurality of PCI buses (the first PCI bus and the second PCI bus in this description) are composed hierarchically from the processor bus 300.

Now, suppose that an access is made from a device (for example, PCI host bridge 43) connected to the first PCI bus (primary bus) 301 to a device (for example, PCI agent device 46) connected to the second PCI bus (secondary bus) 302.

First, the means for interfacing with the first PCI bus (primary bus) 301 of the PCI-to-PCI bridge circuit 44 receives that access. Then, it hands that access to the means interfacing with the second PCI bus (secondary bus) 302 of the PCI-to-PCI bridge circuit 44. There, the means interfacing with the second PCI bus (secondary bus) 302 generates a bus cycle as access on the second PCI bus (secondary bus) 302, and accesses the PCI agent device 46.

Similarly, suppose that an access is made from a device connected to the second PCI bus (secondary bus) 302 to a device connected to the first PCI bus (primary bus) 301.

First, the means for interfacing with the second PCI bus (secondary bus) 302 of the PCI-to-PCI bridge circuit 44 receives the access, and hands the access to the means interfacing with the first PCI bus (primary bus) 301. Then, the means interfacing with the first PCI bus (primary bus) 301 generates a bus cycle as access on the first PCI bus (secondary bus) 302, and provokes an access.

As the PCI-to-PCI bridge circuit 44 performs the bus coordination between the first PCI bus (primary bus) 301 and the second PCI bus (secondary bus) 302 and the PCI-to-PCI bridge circuit 44 itself has a configuration area, functions possessed by the PCI-to-PCI bridge circuit 44 can be added as new functions to an existing PCI agent device, by designing a PCI-to-PCI bridge circuit 44 having functions to be extended in advance.

However, this prior art has the following problems.

First, the circuit scale of PCI-to-PCI bridge circuit 44 is too large. Moreover, this large circuit scale increases the designing load and the price of the device to be manufactured.

This reason is because the data transfer during the PCI transaction requires a control circuit for the bus coordination between the first PCI bus (primary bus) 301 and the second PCI bus (secondary bus) 302 and a data buffer for the bus coordination.

Second, the control of functions to be extended is delicate.

This reason is because the configuration area possessed by the existing PCI agent device and the configuration area possessed by the PCI-to-PCI bridge circuit are completely discrete.

Referring now to FIGS. 2 through 7, description will proceed to a first embodiment of the present invention.

When "–A" is added to the name of a signal, the signal is to be connected to the PCI bus 101, and when "–B" is added, the signal is connected to the PCI bus 102. In addition, if "#" is added to the name of a signal, it concerns a control signal to make "Low" active.

Figure 2:
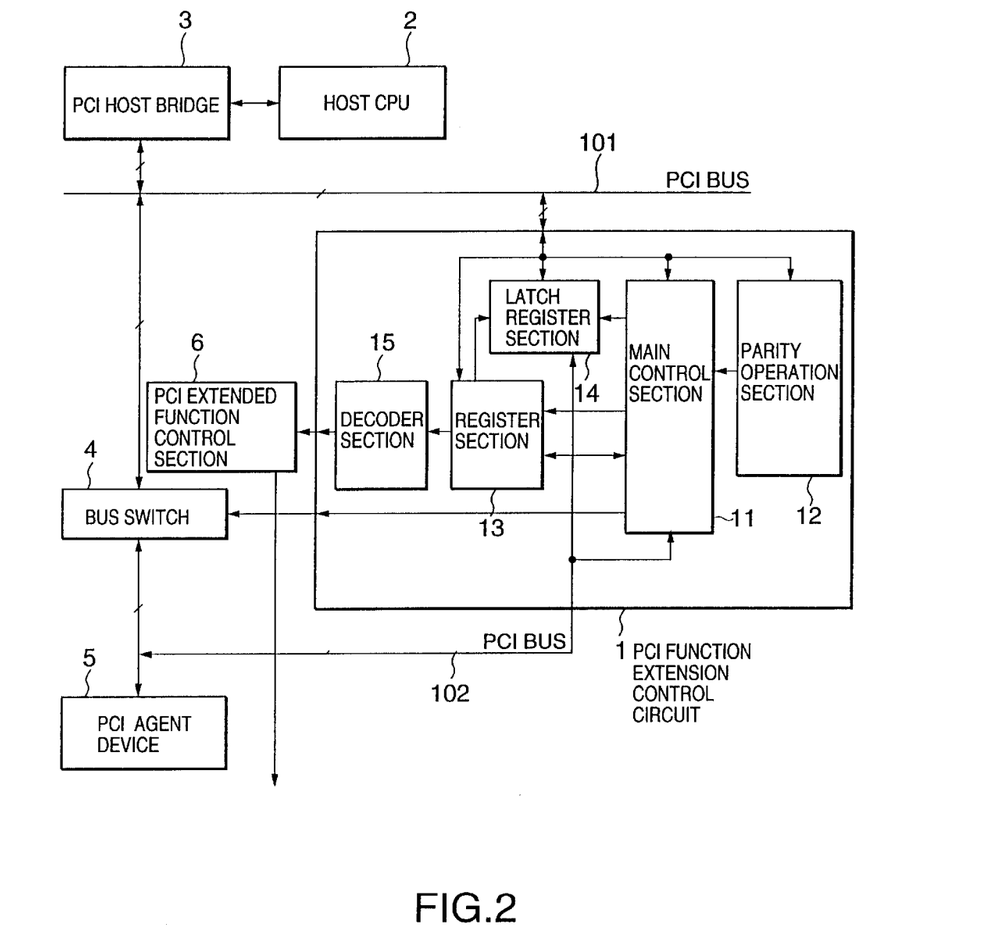
FIG. 2 is an outline diagram showing the composition of a first embodiment according to the present invention.

FIG. 2 is a schematic diagram showing the composition of this embodiment. In FIG. 2, 1 is a PCI function extension control circuit. The PCI function extension control circuit 1 is composed of a main control section 11, a parity operation section 12, a register section 13, a latch register section 14 and a decoder section 15 described hereinafter. Now, the PCI function extension control circuit 1 is designed to extend the PCI functions based on the information of an extended PCI configuration area, by a virtual addition of a PCI configuration area which a PCI agent device did not possess in advance, by operating the bus transaction from a PCI host bridge mentioned hereinafter to the PCI agent device. Here, 101 and 102 indicate PCI buses. PCI (Peripheral Component Interconnect) is a bus standard proposed mainly by US Intel Corp.

2 indicates a host CPU. The host CPU 2 directs the PCI agent device to transfer data via a program.

3 is a PCI host bridge. The PCI host bridge 3 is composed to ensure the bus bridge control between the host CPU and the PCI bus 101.

4 is a bus switch. The bus switch 4 is interposed between the PCI bus 101 and the PCI bus 102 to open and close the electric connection between the PCI bus 101 and the PCI bus 102. This electric connection is opened or closed by a signal input to the control terminal of the bus switch.

5 indicates a PCI agent device. The PCI agent device 5 is connected to the PCI bus 102. As the PCI bus 101 is connected to the PCI bus 102 through the bus switch 4, the PCI agent device 5 is connected to the PCI bus 101.

6 is a PCI extended function control section. The PCI extended function control section 6 is connected to a decoder section 15 described hereinafter. When an extension circuit is connected to the PCI agent device, the PCI extended function control section 6 generates a control signal on the extension circuit to be connected to the PCI agent device upon the reception of a signal from the decoder section 15. Thereby, an extended function that the PCI agent device did not have in advance can be added.

Here, an extension circuit means a device to be connected to the PCI agent device. For instance, if the PCI agent device is a SCSI (Small Computer System Interface) board, it concerns a hard disk and a scanner to be connected to them.

11 is a main control section. The main control section 11 are connected to the PCI bus 101 and the PCI bus 102 respectively separately. Moreover, the main control section 11 has a means connected to the control terminal of the bus switch 4 to control the opening/closing of the bus switch 4. Moreover, the main control section 11 monitors the transaction occurring on the first PCI bus and the second PCI bus, disconnects the PCI bus 101 and the PCI bus 102 by controlling the opening/closing of the bus switch 4 if the PCI transaction generated from the PCI host bridge 3 corresponds to the configuration area of the PCI agent device 5, and commands the PCI bus transaction by creating again the disconnected PCI control signal. On the other hand, the main control section 11 is also connected to a parity operation section 12 to create a parity signal for the PCI bus 101 and the PCI bus 102 for the operation of the PCI bus transaction, from the control signal of the PCI bus 101, the control signal of the PCI bus 102 and the parity data.

12 is a parity operation section. The parity operation section 12 is connected to the PCI bus 101 and the main control section 11, to operate the even parity from AD_A [31::0] and C/BE [3::0]# and generate parity data.

13 is a register section. The register section 13 is connected to the main control section 11, the PCI bus 101 and a decoder section 15 mentioned hereinafter. And it is composed to hold and output the value as the extended PCI configuration area by means of the control signal of the PCI bus 101 and the PCI bus 102, and the PCI control signal newly created by the main control section

14 is a latch register section. The latch register section 14 is connected to the PCI bus 101, the PCI bus 102, the main control section and the register section 13. And the latch register section 14 combines data on the PCI bus 102 with data stored in the register section 13, based on the control signal of the PCI bus 102 and a new PCI control signal created by the main control section 11 to hold them. And, if the PCI bus transaction created from the PCI host bridge 3 is a readout from the PCI configuration area, it outputs the held data on the PCI bus 101.

15 is a decoder section. The decoder section 15 is connected to the register section 13 and PCI extended function control section 6. And, the decoder section 15 generates in the PCI extended function control section 6 a PCI control signal that the PCI agent device 5 did not have in advance, based on the data stored in the register 13.

Now, the operation of this embodiment will be described.

For instance, when data is transferred between the PCI host bridge 3 and the PCI agent device 5, suppose that the data transfer is a reading of PCI configuration data from the PCI agent device 5. In this case, data returned from the PCI agent device 5 to the PCI host bridge 3 and data held in the register section 13 are composed to transfer to the PCI host bridge.

Moreover, when data is transferred between the PCI host bridge 3 and the PCI agent device 5, suppose that the data transfer is a writing of PCI configuration data to the PCI agent device 5. In this case, among data returned from the PCI agent device 5, is data of the desired extended area that is held in the register section 13.

These operations allow to present the PCI configuration area that the PCI agent device 5 did not have in advance to the host bridge 3 as if it is possessed virtually. On the other hand, the decoder section 15 makes the PCI extended function control section 6 generate a control signal by the value in the register section 13. The control signal generated by this PCI extended function control section 6 is output to an extension circuit to be connected to the PCI agent device 5. This allows to add a PCI extended function that the PCI agent device 5 did not have in advance.

Figure 3:
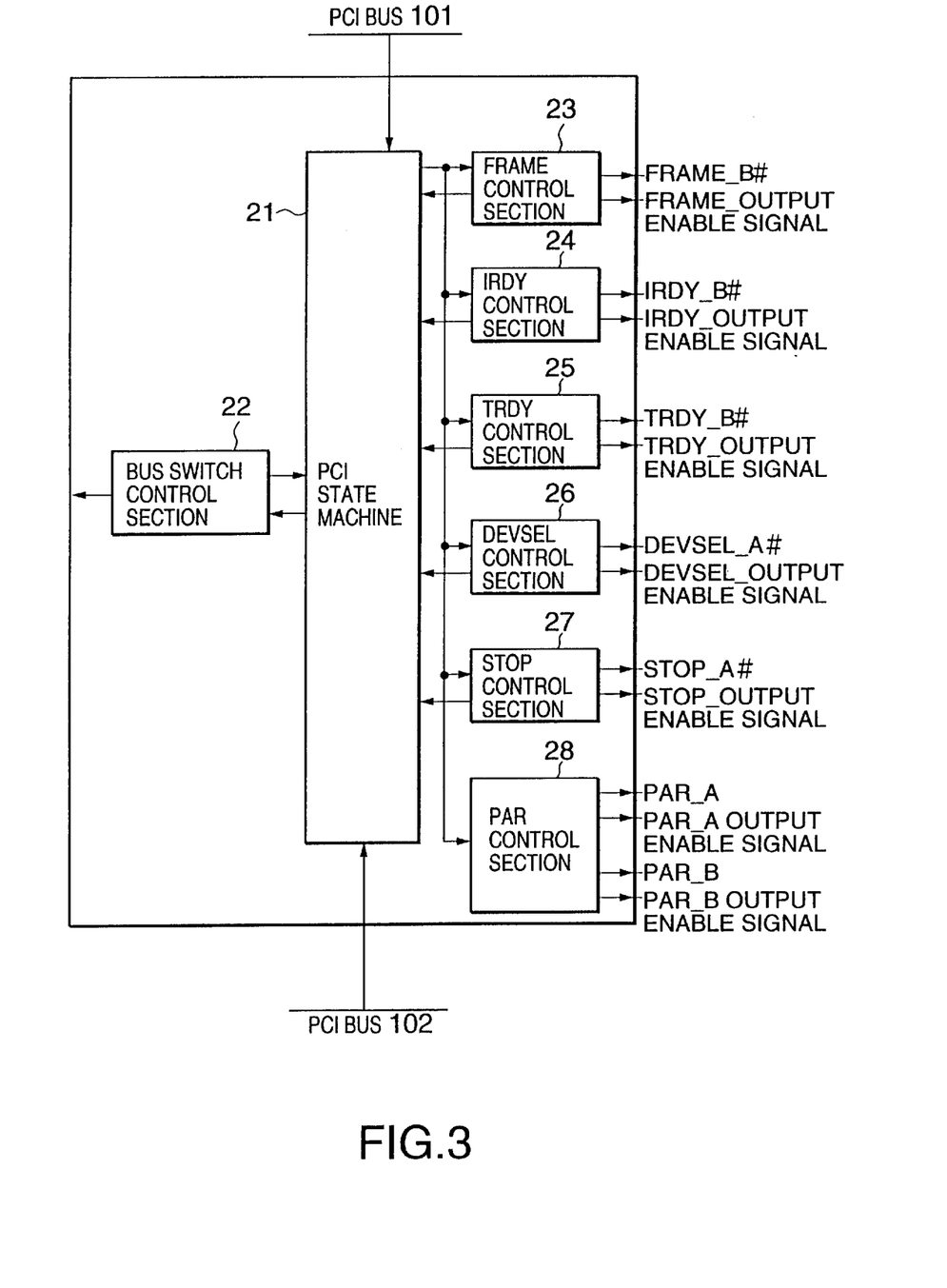
FIG. 3 is a block diagram showing the inner composition of a main control section 11 of the first embodiment according to the present invention.

FIG. 3 is a block diagram showing the inner composition of the main control section 11 in this embodiment.

In FIG. 3, 21 indicates a PCI state machine. The PCI state machine 21 is connected to the PCI bus 101 and the PCI bus 102, monitors PCI bus transactions over the PCI bus 101 and generates PCI status information showing the phase in the course of transaction.

22 is a bus switch control section. The bus switch control section 22 is connected to the PCI state machine 21 and generates a bus switch control signal to control the bus switch 4, if the PCI transaction generated from the PCI host bridge 3 is a configuration area of the PCI agent device 5, based on the PCI status information from the PCI state machine 21.

23 is a FRAME control section. The FRAME control section 23 is connected to the PCI state machine 21. Then, the FRAME control section 23 creates and generates a FRAME_B# signal as PCI control signal of the time when the bus switch 4 is controlled to disconnect the PCI bus 101 and the PCI bus 102 and, additionally, creates and generates a FRAME output enable signal of this FRAME_B# signal.

24 is an IRDY control section. The IRDY control section 24 is connected to the PCI state machine 21. Then, the IRDY control section 24 creates and generates a IRDY_B# signal as PCI control signal of the time when the bus switch 4 is controlled to disconnect the PCI bus 101 and the PCI bus 102 and, additionally, creates and generates a IRDY output enable signal of this IRDY_B# signal.

25 is an TRDY control section. The TRDY control section 25 is connected to the PCI state machine 21. Then, the TRDY control section 25 creates and generates a TRDY_B# signal as PCI control signal of the time when the bus switch 4 is controlled to disconnect the PCI bus 101 and the PCI bus 102 and, additionally, creates and generates a TRDY output enable signal of this TRDY_B# signal.

26 is an DEVSEL control section. The DEVSEL control section 26 is connected to the PCI state machine 21. Then, the DEVSEL control section 26 creates and generates a DEVSEL_A# signal as PCI control signal of the time when the bus switch 4 is controlled to disconnect the PCI bus 101 and the PCI bus 102 and, additionally, creates and generates a DEVSEL output enable signal of this DEVSEL_A# signal.

27 is an STOP control section. The STOP control section 27 is connected to the PCI state machine 21. Then, the STOP control section 27 creates and generates a STOP_A# signal as PCI control signal of the time when the bus switch 4 is controlled to disconnect the PCI bus 101 and the PCI bus 102 and, additionally, creates and generates a STOP output enable signal of this STOP_A# signal.

28 is an PAR control section. The PAR control section 28 is connected to the PCI state machine 21, and the parity operation section 12. Then, the PAR control section 28 creates and generates PAR_A and PAR_B as PCI control signal of the time when the bus switch 4 is controlled to disconnect the PCI bus 101 and the PCI bus 102 and, additionally, creates and generates a PAR_A output enable signal and a PAR_B output enable signal of these PAR_A and PAR_B.

Figure 4:
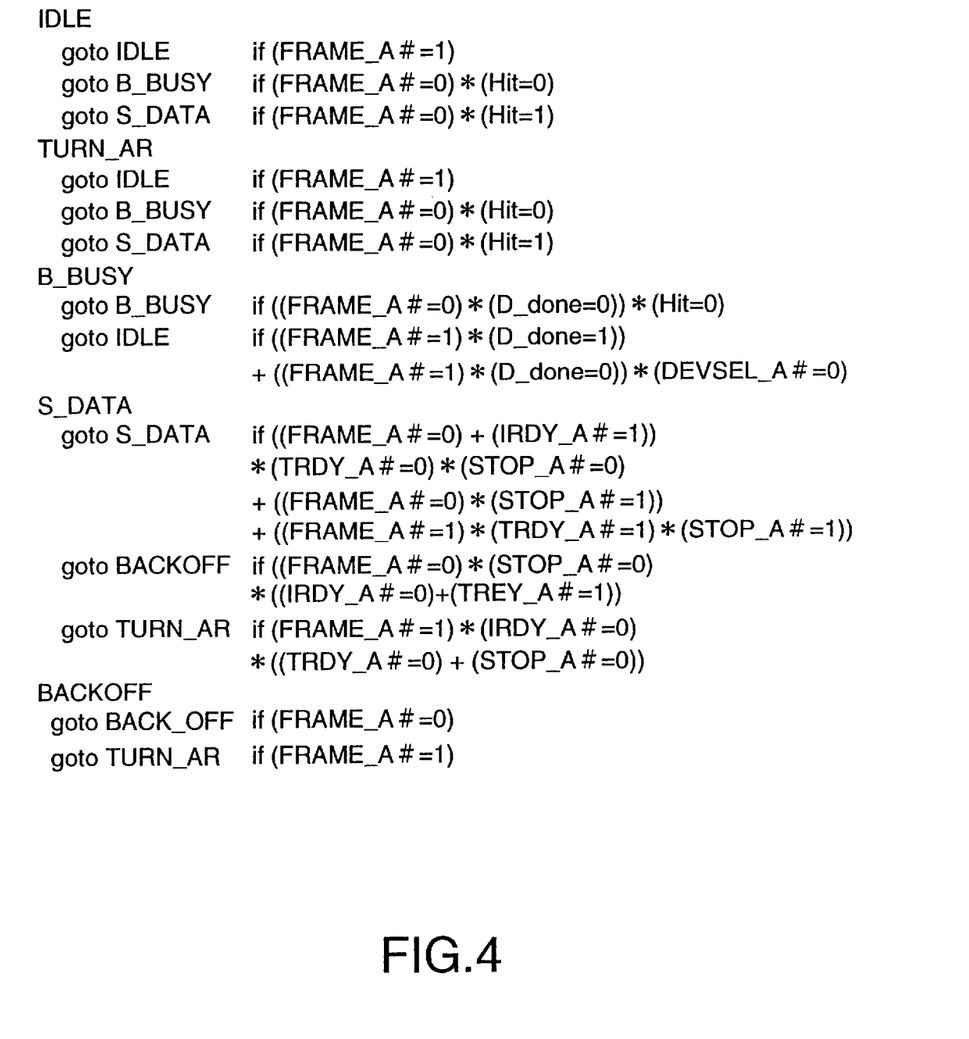
FIG. 4 shows a status transition sequence of a PCI state machine of the first embodiment according to the present invention.

Now, referring to FIG. 4, the PCI state machine 21 will be described. FIG. 4 show the status transition sequence of the PCI state machine 21.

The PCI state machine 21 operates with the status transition sequence by the logic shown, for instance, in the expression of FIG. 4.

In FIG. 4, IDLE represents the state of idle condition.

TURN_AR represents the state when a transaction to which it is involved itself is terminated on the PCI bus.

B_BUSY represents the state during a transaction to which it in not involved itself.

S_DATA represents the state where the target may transfer data.

BACKOFF represents the state waiting that the target asserts STO# and the master deassert FRAME_A#.

Hit represents the state whether the address decode has hit (agreement, or disagreement) or not.

D_done represents the state whether the device has completed the address decode.

Figure 5:
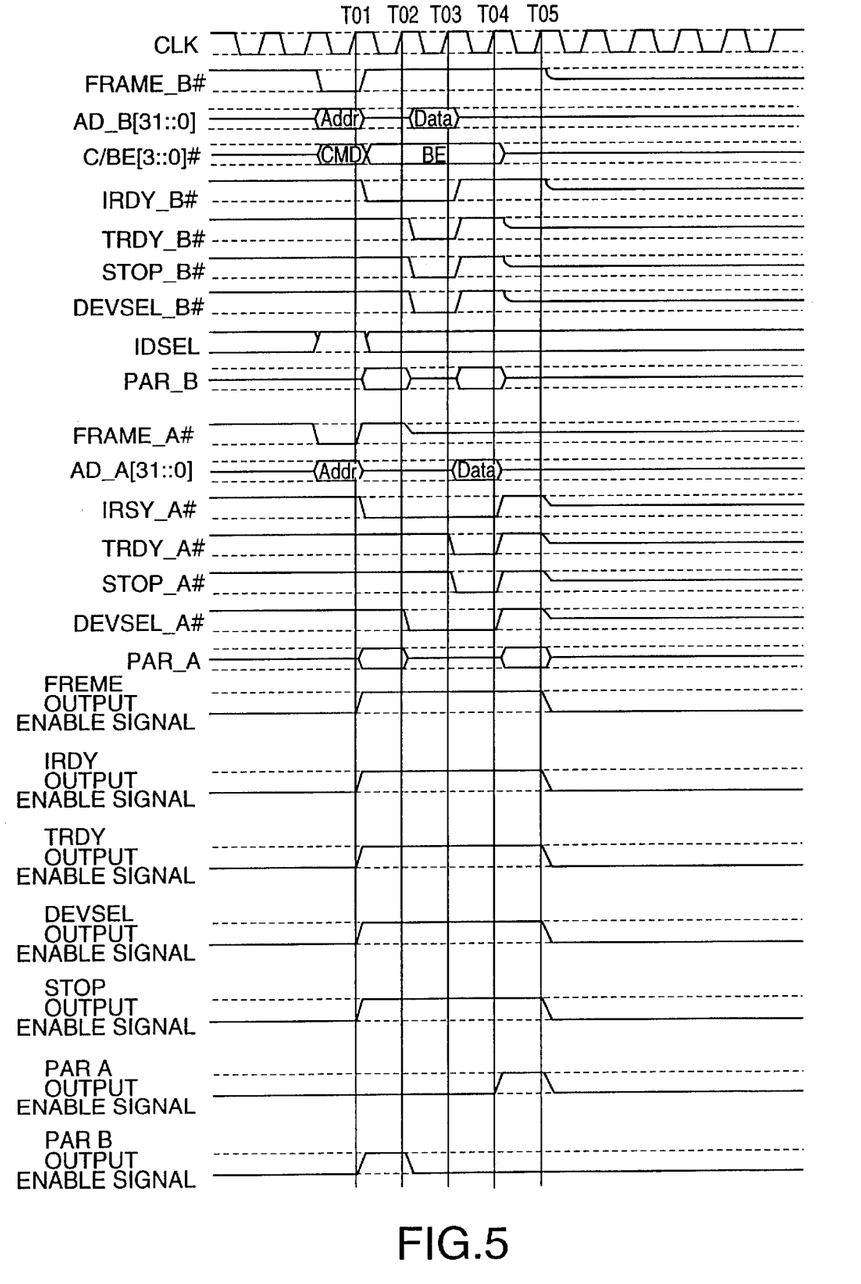
FIG. 5 is a timing chart diagram showing a single data transfer cycle of a configuration read transaction in a PCI bus transaction of the first embodiment according to the present invention.
Figure 6:
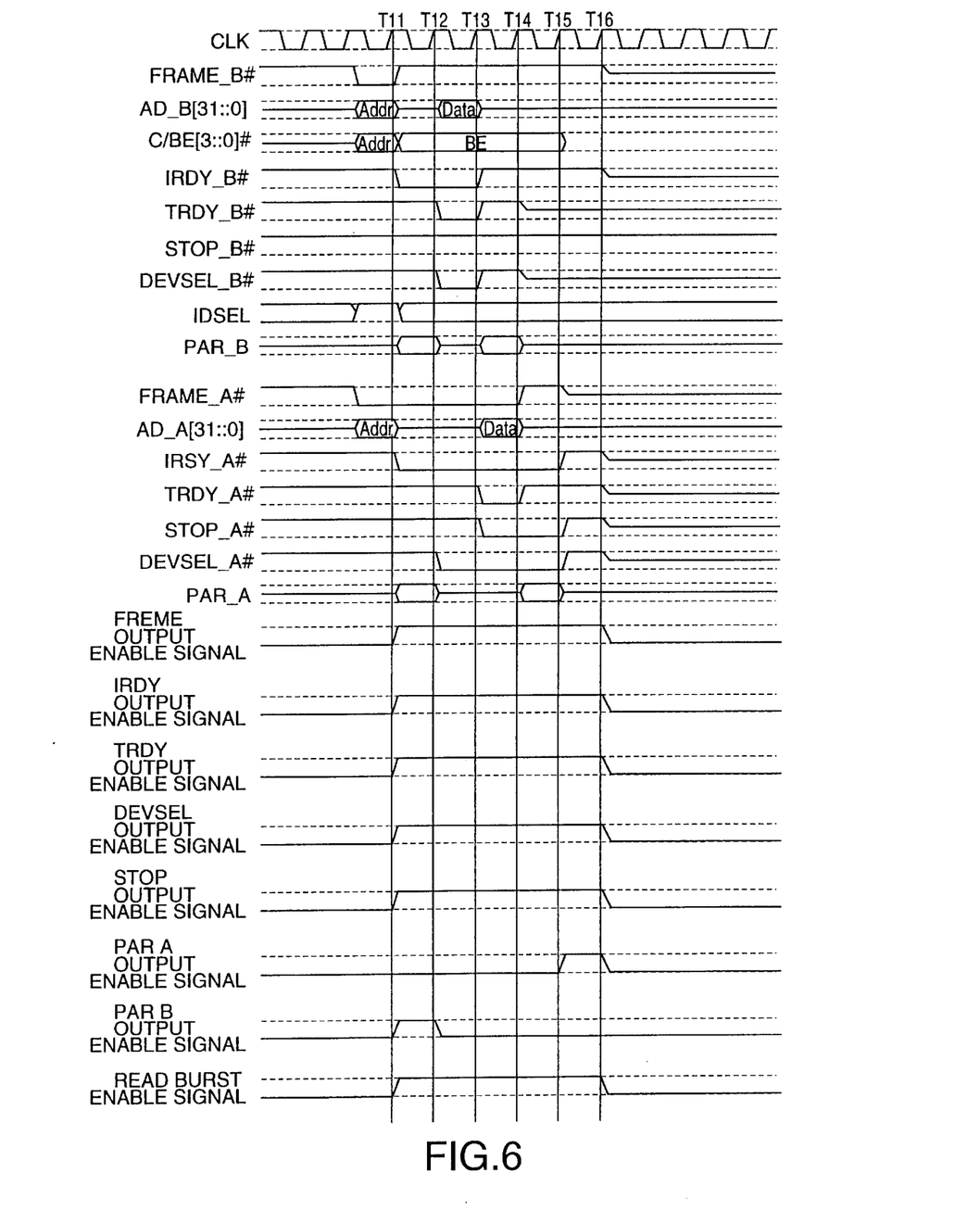
FIG. 6 is a timing chart diagram showing a burst data transfer cycle of a configuration read transaction in a PCI bus transaction of the first embodiment according to the present invention.
Figure 7:
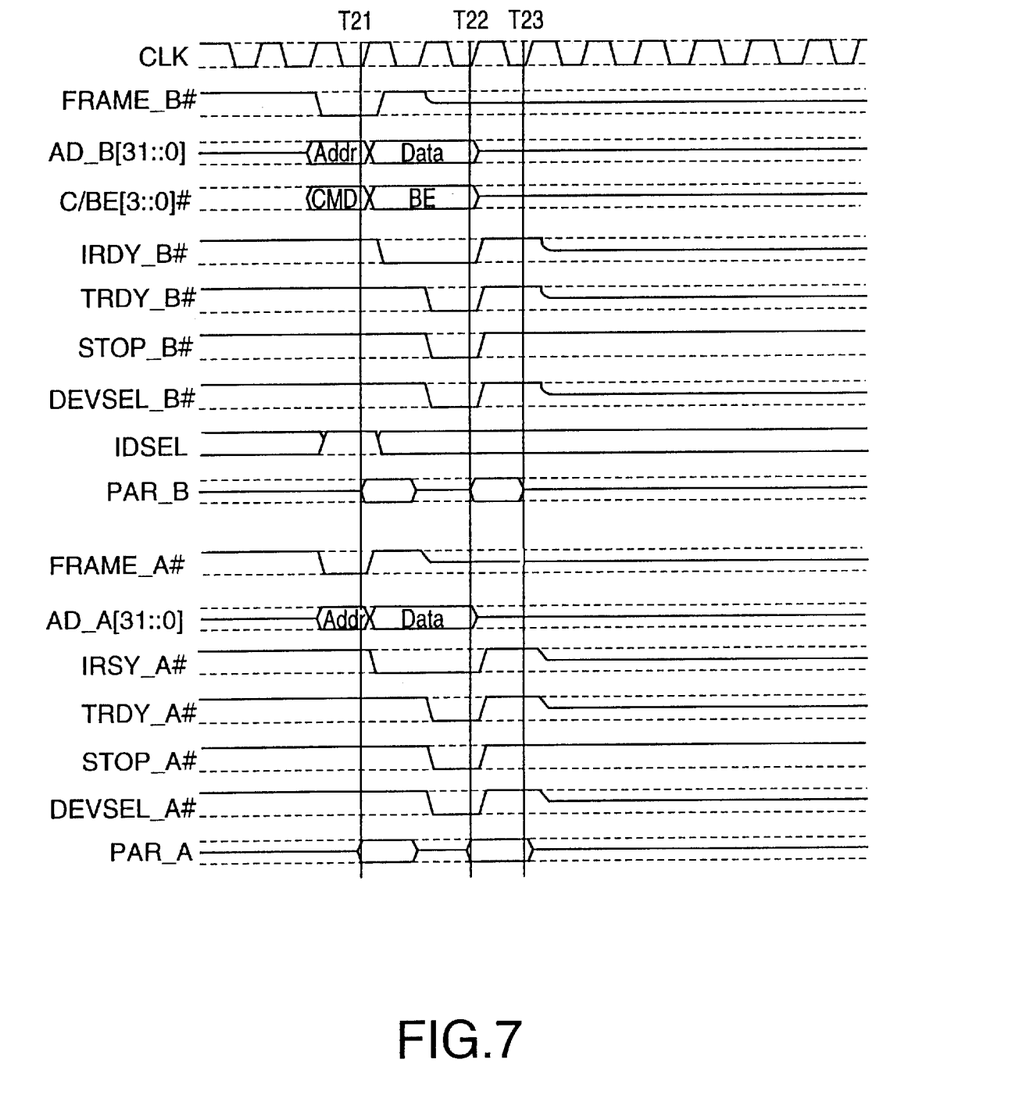
FIG. 7 is a timing chart diagram showing a single data transfer cycle of a configuration write transaction in a PCI bus transaction of the first embodiment according to the present invention.

Now, referring to FIG. 5 to FIG. 7, the operation of the circuit of this embodiment shown in FIG. 2 will be described in detail. FIG. 5 to FIG. 7 show the timing chart of the circuit of this embodiment.

For the procedures of a typical PCI bus transaction, please refer to "PCI BUS SPECIFICATION REVISION 2.1" PCI Special Interest Group.

FIG. 5 is a timing chart showing the operation of a single data transfer cycle of configuration read transaction in a PCI bus transaction.

In FIG. 5, FRAME_A# is asserted by the PCI host bridge on the PCI bus 101 at T01, IDSEL is driven to Hi, and as C/BE [3::0]# is a configuration read command, it means that the PCI configuration cycle to the PCI agent device 5 has started.

The main control section 11 recognizes the start of the PCI configuration read cycle at T01, transmits the inner status information, while the bus switch control section 22 controls to disconnect the bus switch 4.

In the main control section 11, at the same time as this state transition, the FRAME control section 23, the IRDY control section 24, the TRDY control section 25, the DEVSEL control section 26 and the STOP control section 27 make respectively the FRAME output enable signal, the IRDY output enable signal, the TRDY output enable signal, the DEVSEL output enable signal and the STOP output enable signal active, while the PAR control section 28 activates PAR_B output enable signal. The FRAME control section 23 activates the FRAME output enable signal and, at the same time, drives Hi to FRAME_B# and deassert FRAME_B#. On the other hand, the IRDY control section 24 activates the IRDY output enable signal and, at the same time, outputs the state of IRDY_A# driven by the PCI host bridge 3 to IRDY_B#. The PAR control section 28 latches and outputs the parity data from the parity control section 12 as PAR_B. Further, the register section 13 latches the address of the access destination on AD_A [31::0] at T01.

Now, referring to FIG. 5, the IRDY control section 24 recognizes that IRDY_A# is asserted by the PCI host bridge at T02 and drives IRDY_B# to "Low", while the DEVSEL control section 26 output to DEVSEL_A# the state of DEVSEL_B# driven by the PCI agent device 5. At T02 also, the PAR control section 28 inactivates the PAR_B output enable signal.

Moreover, referring to FIG. 5, the IRDY control section 24 recognizes that TRDY_B# is asserted by the PCI agent device 5 at T03 and drives IRDY_B# to "Hi" to deassert. At this time, as the PCI bus 101 and the PCI bus 102 are disconnected by the bus switch 4 and the IRDY_B# is deasserted with FRAME_B# deasserted, it means that the last data phase of this PCI transaction has terminated on the PCI bus 102 side. At T03 also, the TRDY control section 25 recognizes that TRDY_B## is asserted, asserts TRDY_A#, while the DEVSEL control section 26 recognizes that DEVSEL_B# is asserted and drives DEVEL_A# to "Low". Moreover, the latch register section 14 latches the value of AD_B [31::0] on the PCI bus 102 driven by the PCI bus 101 and the PCI bus 102 and outputs to AD_A [31::0]. At this time, in the latch register section 14, if the address destination is the area extended by the circuit of the present invention, data stored in the register section 13 corresponding to that address is combined and latched. Also, at T03, in the STOP control section 27, if STOP_B# is asserted by the PCI agent device 5, STOP_A# is asserted.

Further, referring to FIG. 5, at T04, the TRDY control section 25 and the DEVSEL control section 26 recognize the state wherein FRAME_A# is deasserted by the PCI host bridge 3 and IRDY_A# is asserted, and drives TRDY_A# and DEVSEL_A# to "Hi". Moreover, at T04, in the STOP control section 17, if STOP_A# is asserted, STOP_A# will be deasserted. Also at T04, the PAR control section 28 activates the PAR_A output enable signal, latches and outputs the parity data from the parity control section 12 as PAR_A. At that time, as IRDY_A# is asserted and TRDY_A# is asserted with the state wherein FRAME_A# is deasserted on the PCI bus 101, it means that the last data transfer phase of this PCI bus transaction has been terminated. Here, the main control section 11 recognizes the data transfer phase termination and causes the transition of the inner status information.

Also, referring to FIG. 5, at T05, the main control section 11 provokes the transition of the inner status information as the deassert period to the control signal of the PCI bus 101 after the termination of the last data transfer phase on the PCI bus 101 has completed. At T05 too, the FRAME control section 23, the IRDY control section 24, the TRDY control section 25, the DEVSEL control section 26 and the STOP control section 27 and PAR control section 28 make respectively the FRAME output enable signal, the IRDY output enable signal, the TRDY output enable signal, the DEVSEL output enable signal, the STOP output enable signal and the PAR_A output enable signal inactive, while the bus switch control section 22 controls the bus switch 4 to connect the PCI bus 101 and the PCI bus 102.

Next, FIG. 6 is a timing chart diagram showing the operation of the burst data transfer cycle of the configuration read transaction in the PCI bus transaction.

Next, referring to FIG. 6, at T11, on the PCI bus 101, as FRAME_A# is asserted by the PCI host bridge, IDSEL is driven to "Hi" and C/BE [3::0]# is a configuration read command, it means that the PCI configuration read cycle to the PCI agent device 5 has started. The main control section 11, at T11, recognizes the start of the PCI configuration read cycle and causes the transition of the inner status information, while the bus switch control section 22 controls to open the bus switch 4. In the main control section 11 also, at the same time as this state transition, the FRAME control section 23, the IRDY control section 24, the TRDY control section 25, the DEVSEL control section 26 and the STOP control section 27 make respectively the FRAME output enable signal, the IRDY output enable signal, the TRDY output enable signal, the DEVSEL output enable signal and the STOP output enable signal active, while the PAR control section 28 activates PAR_B output enable signal. The FRAME control section 23 activates the PAR_B output enable signal. The FRAME control section 23 activates the FRAME output enable signal and, at the same time, drives FRAME_B# to "Hi" and deasserts FRAME_B#. On the other hand, the IRDY control section 24 activates the IRDY output enable signal and, at the same time, outputs the state of IRDY_A# driven by the PCI host bridge 3 to IRDY_B#. The PAR control section 28 latches and outputs the parity data from the parity control section 12 as PAR_B. Further, the register section 13 latches the address of the access destination on AD_A [31::0] at T11.

Also, referring to FIG. 6, at T12, the IRDY control section 24 recognizes that IRDY_A# is asserted by the PCI host bridge 3 and drives IRDY_B# to "Low", while the DEVSEL control section 26 outputs to DEVSEL_A# the state of DEVSEL B# driven by the PCI agent device 5. At this time, the PAR control section 28 inactivates the PAR_B output enable signal. At T12 also, the main control section 11 recognizes that this PCI bus transaction is the burst cycle and generates a read burst enable signal as FRAME_A# remains asserted with IRDY_A# being asserted.

Further, referring to FIG. 6, at T13, the IRDY control section 4 recognizes that TRDY_B# is asserted by the PCI agent device 5, and drives IRDY_B# to "Hi" to deassert. At this time, as the PCI bus 101 and the PCI bus 102 are disconnected by the bus switch 4 ans IRDY_B# is deasserted with FRAME_B# being deasserted, it means the last data phase of this PCI bus transaction on the side of the PCI bus 102. Also, at T13, the TRDY control section 25 recognizes TRDY_B# is asserted and asserts TRDY_A#, while DEVSEL control section 26 recognezes that DEVSEL_B# is asserted and drives DEVSEL_A# to "Low". On the other hand, the latch register section 14 latches the value of AD_B[31::0] on the PCI bus 102 driven by the PCI agent device 5 and outputs to AD_A [31::0]. At this time, PCI bus 102 and outputs to AD_A [31::0]. At this time, in the latch register section 14, if the address destination is the area extended by the circuit of the present invention, data stored in the register section 13 corresponding to that address is combined and latched. Also, at T13, the STOP control section 27, receives a read burst enable signal, asserts STOP_A# regardless of the state of STOP_B# driven by the PCI agent device 5, and presents the PCI host bridge, the termination demand of this bus transaction.

Further, referring to FIG. 6, at T14, the TRDY control section 25 recognizes the state wherein IRDY_A# is asserted by the PCI host bridge 3, and drives TRDY_A# to "Hi" and deasserts. Here, the main control section 11 recognizes the data transfer phase termination of the PCI bus transaction and causes the transition of the inner status information. Further, at T14, the PAR control section 28 activate the PAR_A output enable signal, latches and output as PAR_A the parity data from the parity control section 12.

Moreover, referring to FIG. 6, at T15, the PCI host bridge 3 deasserts FRAME_A# by the fact that STOP_A# has been asserted, and as STOP_A# is asserted with IRDY_A# asserted, it means that the wait state of this PCI bus transaction has terminated. Here, the main control section 11 recognized that the wait state of this PCI bus transaction has terminated and causes the transition of the inner status information. At this time, the DEVSEL control section 26 and the STOP control section 27 drive respectively DEVSEL_A# and STOP_A# to "Hi" and deassert On the other hand, the PAR control section 28 inactivates the PAR_A output enable signal.

Further, referring to FIG. 6, at T16, the main control section 11 causes the transition of the inner status information as the deassert period of the control signal of the PCI bus 101 after the end of the wait state on the PCI bus 101. Also at T16, the FRAME control section 23, the IRDY control section 24, the TRDY control section 25, the DEVSEL control section 26 and the STOP control section 27 make respectively the FRAME output enable signal, the IRDY output enable signal, the TRDY output enable signal, the DEVSEL output enable signal and the STOP output enable signal inactive, while the bus switch control section 22 controls to connect the PCI bus 101 and the PCI bus 102.

Next, FIG. 7 is a timing chart diagram showing the operation of the single data transfer cycle of the configuration write transaction in the PCI bus transaction.

In this embodiment, in case of configuration write transaction, the manipulation of the PCI bus transaction is not performed particularly, but the operation consists only in the transition of the status data in the main control section 11, and the value latching to the register section 13 at the timing when the write data becomes active. For this reason, only the single data transfer cycle will be described. In case of burst data transfer cycle, when data is written, the address of the next write destination is simply incremented consecutively.

Further, referring to FIG. 7, at T21 on the PCI bus 101, as FRAME_A# is asserted by the PCI host bridge, IDSEL is driven to "Hi" and C/BE [3::0]# is a configuration write command, it means that the PCI configuration write cycle to the PCI agent device 5 has started. The main control section 11, at T21, recognizes the start of the PCI configuration cycle and causes the transition of the inner status information. At this time, the main control section 11 only causes the transition of the inner status information without performing the operation, while the register section 13 latches at T21 the address of the access destination on AD_A [31::0] at T11.

Also, referring to FIG. 7, at T22 the register section 13, as TRDY_B# is asserted with IRDY_A# asserted, stores data on AD_A [31::0] to a register of the configuration area of the address of the access destination latched in the register section 13. Also at T22, as IRDY_A# is asserted and TRDY_A# is asserted with FRAME_A# deasserted, it means the last data transfer phase of the PCI bus transaction, and the main control section 11 causes the transition of the inner status information.

Moreover, referring to FIG. 7, at T23 the main control section 11 causes the transition of the inner status information as the deassert period of the control signal of the PCI bus 101 after the end of the last data transfer phase on the PCI bus 101.

Figure 8:
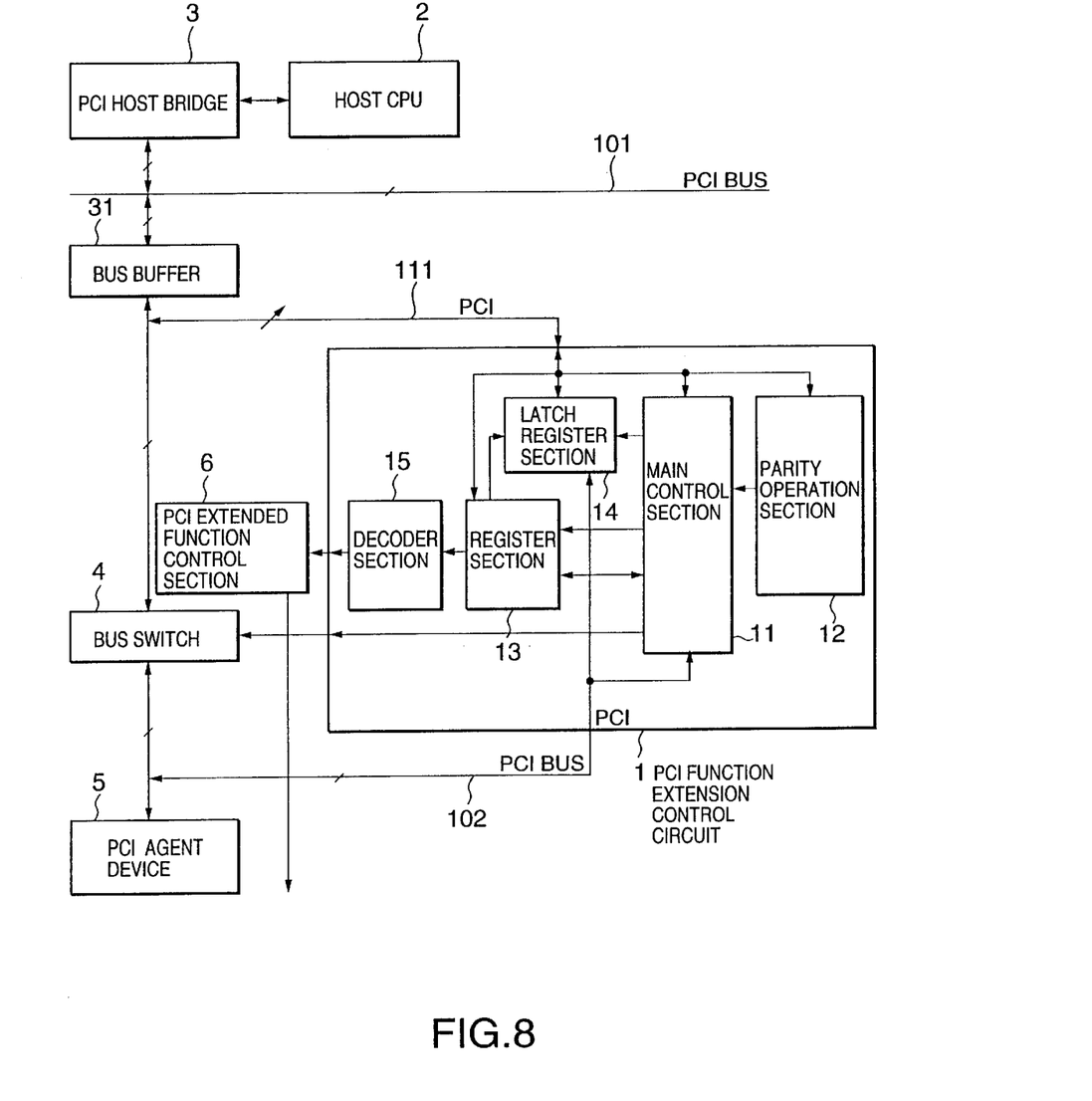
FIG. 8 is an outline diagram showing the composition of a second embodiment according to the present invention.

Next, referring to FIG. 8, description will proceed to a second embodiment of the present invention.

Note that, in the description of the second embodiment, the description of parts similar to those of the first embodiment will be omitted, and only different parts will be described.

FIG. 8 shows an outline of the composition of the second embodiment

In FIG. 8, 31 is a bus buffer. The bus buffer 31 ensures the buffering of various signals of the PCI 101.

111 is a PCI bus. The PCI bus 111 is connected to the PCI bus 101 via the bus buffer 31. On the other hand, the PCI bus 111 is connected to a PCI function extension control circuit 1 and a bus switch 4.

Now, the operation of the second embodiment will be described. The number of devices that can be connected simultaneously, on a same PCI bus, is limited. Therefore, in the PCI bus specifications, when a PCI extension is designed, the connection load capacity of a single signal is limited.

Therefore, there is a problem that a PCI bus on a PCI extension card and a PCI function extension control circuit and a bus switch can not be connected directly when an existing PCI agent device is connected to the PCI bus on the PCI extension card, because a single device attains the load capacity limit.

Therefore, in the second embodiment, for instance, an output signal from a PCI host bridge to a PCI agent device 5 is first received by the bus buffer 31. The bus buffer 31 makes the buffering of that signal and outputs. The PCI agent device 5 receives that output signal via the PCI function extension circuit 1 and the bus switch 4.

As the consequence, the output signal from the PCI host bridge 3 can drive two devices, PCI function extension circuit 1 and PCI agent device 5 with a single device load to the bus buffer 31.

Thus, in a case where a load capacity limit would be imposed to the signal of a PCI device where a PCI extension card is to be designed, the installation of the bus buffer 31 according to the another embodiment allows to mitigate the load capacity as only the bus buffer 31 is connected to the PCI bus 101.

As mentioned above, the first effect of the present invention is the possibility to extend the configuration area of an existing PCI agent device with a small circuit composition, without requiring a device of large circuit composition such as PCI-to-PCI bridge.

This reason is because, the PCI bus transaction is so manipulated to add virtually a configuration area.

And the second effect is the possibility to extend a function using the configuration area as a single without design modification or the like of an existing device.

This reason is because the function can be extended based on the virtually added configuration area.

And the third effect is the possibility to connect a plurality of devices (for example, PCI function extension control circuit and bus switch) on a same PCI bus, even when a load capacity limit is imposed to a PCI bus signal.

This is because a buffer is interposed between the PCI bus and the device.

What is claimed is:

1. A PCI function extension control device in a PCI bus system, comprising
   a PCI function extension control circuit to be connected to a first PCI bus;
   a second PCI bus possessed by said PCI function extension control circuit;
   a bus switch to be connected between the first PCI bus and a second PCI bus; and
   means for disconnecting or connecting the first PCI bus and the second PCI bus upon the reception of an open and close control signal, respectively, from said PCI function extension control circuit, said bus switch being connected to said PCI function extension control circuit; and
   said PCI function extension control circuit being composed to monitor a transaction of the first PCI bus and the second PCI bus, to make said bus switch emit an open and close control signal when the transaction concerns an access to a desired PCI extension configuration area added to said PCI function extension control circuit to provide a PCI agent device with an extended configuration area for extending PCI functions of the PCI agent device, and to deliver a desired PCI control signal to the first PCI bus or the second PCI bus.

2. The PCI function extension control device according to claim 1, wherein said PCI function extension control circuit comprises means for monitoring the transaction of the first PCI bus and the second PCI bus, to make said bus switch emit an open and close control signal when the transaction concerns an access to the desired PCI extension configuration area provided to said PCI agent device to be connected to the second PCI bus, and to deliver a desired PCI control signal to the first PCI bus or the second PCI bus.

3. The PCI function extension control device according to claim 2, wherein said PCI function extension control circuit further comprises a means for making an extension circuit to be connected to said PCI agent device and for delivering a control signal from a PCI function control section to said extension circuit based on a control signal from the PCI function extension control circuit to said PCI function control section.

4. The PCI function extension control device according to claim 3, further comprising a bus buffer to be connected to the first PCI bus, wherein said PCI function extension control circuit is connected to the first PCI bus via said bus buffer and said bus switch is connected to the first PCI bus via said bus buffer.

5. A method of PCI function extension control for a PCI bus system comprising a first PCI bus, a PCI function extension control circuit to be connected to the first PCI bus, a second PCI bus possessed by the PCI function extension control circuit, a bus switch to be connected between the first PCI bus and the second PCI bus including a means for disconnecting or connecting the first PCI bus and the second PCI bus, and a PCI device agent to be connected to the second PCI bus, the method comprising the steps of:

monitoring if a transaction of the first PCI bus and the second PCI bus is an access to a desired PCI extension configuration area added to said PCI function extension control circuit to provide the PCI agent device with an extended configuration area for extending PCI functions of the PCI agent device; and controlling said bus switch to deliver a desired PCI control signal to the first PCI bus and the second PCI bus, when the result of said monitoring step concerns the access to the desired PCI extension configuration area.

6. The method of PCI function extension control according to claim 5, further comprising a step of delivering a control signal to an extension circuit to be connected to said PCI agent device, when the result of said monitoring step concerns the access to the desired PCI extension configuration area.

7. A method of PCI function extension control for a PCI bus system, comprising the steps of:

making a PCI function extension control circuit monitor if a transaction of a first PCI bus is an access to a desired PCI extension configuration area added to said PCI function extension control circuit to provide a PCI agent device with an extended configuration area for extending PCI functions of the PCI agent device;

disconnecting a signal from a first PCI bus to the PCI agent device to deliver a desired PCI control signal to the PCI agent device via a second PCI bus, when the result of said monitoring concerns the access to the desired PCI extension configuration area;

directing the PCI function extension control circuit to monitor if a transaction of the second PCI bus is an access to said desired PCI extension configuration area; and disconnecting a signal from the PCI agent device to the first PCI bus to deliver a desired PCI control signal to the PCI agent device, when the result of said monitoring step concerns the access to the desired PCI extension configuration area.

* * * * *